United States Patent [19]
Pennell

[11] Patent Number: 6,099,206
[45] Date of Patent: Aug. 8, 2000

[54] DENSITY MODIFICATION DISPLACEMENT TO REMEDIATE CONTAMINATED AQUIFERS

[75] Inventor: Kurt D. Pennell, Atlanta, Ga.

[73] Assignee: Georgia Tech Research Corporation, Atlanta, Ga.

[21] Appl. No.: 09/056,487

[22] Filed: Apr. 7, 1998

[51] Int. Cl.$^7$ ...................................................... B09B 1/00

[52] U.S. Cl. .......................... 405/128; 210/747; 405/258; 588/249

[58] Field of Search ...................................... 405/128, 129, 405/258; 588/249; 134/2, 10; 210/747

[56] References Cited

U.S. PATENT DOCUMENTS

| | | | |
|---|---|---|---|
| 5,240,570 | 8/1993 | Chang et al. | 405/128 X |
| 5,286,140 | 2/1994 | Mather | 405/258 X |
| 5,368,411 | 11/1994 | Losack | 405/128 |
| 5,725,470 | 3/1998 | Lazarowitz et al. | 405/128 X |
| 5,833,756 | 11/1998 | Haegel et al. | 134/10 |
| 5,928,433 | 7/1999 | Jahnke et al. | 588/249 X |

*Primary Examiner*—Dennis L. Taylor
*Attorney, Agent, or Firm*—Todd Deveau, Troutman Sanders, LLP

[57] ABSTRACT

A method for groundwater remediation of DNALP-contaminated aquifers comprising the steps of modifying the density of the DNALP with alcohol and displacing the NAPL by surfactant flushing.

13 Claims, 2 Drawing Sheets

DENSITY MODIFICATION DISPLACEMENT TO REMEDIATE CONTAMINATED AQUIFERS

BACKGROUND OF THE INVENTION

1. Field of the Invention

This invention is related to the remediation of contaminated aquifers. More specifically, the invention relates to the recovery of DNAPLs from contaminated aquifers by density modification displacement.

2. Description of Related Art

The widespread detection of organic contaminants in groundwater has prompted the initiation of remediation efforts at numerous sites throughout the United States. The most common technology employed for aquifer remediation is "pump-and-treat," in which contaminated groundwater is extracted from the subsurface via wells or drainage systems and then treated above ground. Frequently, this approach results in a rapid decrease in aqueous-phase concentrations of the contaminant and a reduction in the size of the contaminated groundwater plume. This initial success, however, is often followed by a gradual decline in contaminant concentrations which may persist for years or decades. Thus, the remediation of an aquifer to a specific health-based standard (e.g., aqueous- or solid-phase concentration) is often not achievable within an acceptable time frame. In addition, the costs associated with maintaining a pump-and-treat system, and monitoring contaminant levels in groundwater can be prohibitive.

One of the most recalcitrant remediation scenarios facing regulatory agencies involves the contamination of aquifers by organic compounds existing as a separate liquid phase or non-aqueous phase liquid (NAPL). Classic examples of NAPLs include chlorinated solvents, such as trichloroethylene (TCE), and petroleum-based products, such as gasoline. Upon entering the unsaturated zone, NAPLs migrate downward as a result of gravitational and capillary forces. If the volume of NAPL released to the subsurface is sufficient to reach the water table, an organic liquid that is more dense than water (DNAPL) will tend to travel vertically through the saturated zone until a confining or low permeability layer is reached. In contrast, a NAPL that is less dense than water (LNAPL) will tend to spread laterally within the capillary fringe, forming a "lens" of free product. Subsequent fluctuations in the water table, however, may result in vertical displacement of the LNAPL lens and consequent redistribution within the saturated zone. The overall distribution of a NAPL within an aquifer formation may be extremely complex due to the presence of small- and large-scale heterogeneities and variations in groundwater flow.

As the NAPL is transported through the subsurface, a portion of the organic liquid is retained within soil pores as ganglia or globules due to capillary forces. Under normal flow regimes the entrapped NAPL will not be displaced from the porous media. This immobile fraction of NAPL is commonly referred to as "residual NAPL" and may occupy between 5 and 40% of the pore volume. Due to the low solubility of most organic liquids, the entrapped NAPL frequently represents a long-term source of groundwater contamination. Thus, conventional pump-and-treat systems, which are based on NAPL dissolution into groundwater, have proven to be an ineffective and costly method of aquifer restoration. When NAPLs are present in the subsurface, the initial success of pump-and-treat systems can be attributed to removal of the contaminated groundwater plume, while the persistent low levels of contaminant in extraction wells is due to NAPL dissolution into "clean" groundwater passing through the zone of residual NAPL contamination.

To overcome the limitations associated with conventional pump-and-treat remediation systems, surfactants have been proposed as a means for enhancing the recovery of NAPLs from subsurface systems. Surfactant-based remediation technologies are based primarily on two recovery processes: (a) micellar solubilization of hydrophobic organic compounds and (b) displacement of the entrapped NAPL as free product due to reductions in the NAPL-water interfacial tension. As shown in FIG. 1, in practice, aqueous surfactant solutions would be introduced through an injection well, allowed to flow through the zone of NAPL contamination, and the resulting NAPL/surfactant solution would be recovered using a down-gradient extraction well.

The most common approach employed in surfactant-enhanced aquifer remediation capitalizes on the ability of surfactants to form micelles, which function to increase the aqueous solubility of NAPLs. Surfactants are amphiphilic compounds, possessing both hydrophilic and hydrophobic moieties. Below the critical micelle concentration (CMC), surfactant molecules exist as monomers and have a minimal effect on the aqueous solubility of most hydrophobic organic compounds (HOCs). As the surfactant concentration approaches the CMC, individual surfactant monomers tend to associate with one another to form micelles consisting of a hydrophobic core surrounded by a hydrophilic mantle or shell. Above the CMC, the solubility of hydrocarbons in aqueous surfactant solutions has been shown to increase in a linear fashion. The observed linear enhancement in solubility is attributed to the incorporation or partitioning of hydrocarbons within surfactant micelles. The resulting solution is thermodynamically stable, consisting of NAPL solubilized or dispersed within surfactant micelles, which are on the order 10 to 100 nm in diameter. This type of system is often referred to as a NAPL-in-water (NAPL/W) microemulsion or Winsor Type I system. In a conceptual sense, micellar solubilization is similar to the partitioning of dissolved organic contaminants into soil organic matter, although it should be recognized that soil organic matter represents a far less uniform and structured environment in comparison to a micellar solution. Over the past several years a number of research groups have demonstrated the capacity of surfactants to improve the removal of entrapped NAPLs from unconsolidated porous media using both micellar solubilization. However, this approach is likely to be prohibitively expensive due to the large amount of surfactant necessary to remove all the NAPL contaminant. A need, therefore, exists for an economically viable remediation process not requiring large amounts of surfactant.

The second approach employed in surfactant flushing is based on the tendency for surfactants to accumulate at interfaces, and the resulting decrease in interfacial tension between entrapped NAPL globules and aqueous surfactant solutions. For several NAPL-surfactant systems, reductions in the interfacial tension to values less than 1.0 dyne/cm have been associated with the onset of NAPL displacement during surfactant flushing. Almost complete displacement (99% recovery) of residual tetrachloroethylene (PCE) from several size fractions of Ottawa sand has been observed after flushing with only 1.5 pore volumes of surfactant solution. The same approach has been investigated by the petroleum industry to enhance oil recovery. In such applications, brines and/or alcohols are frequently added to the surfactant formulation in order to achieve ultra-low interfacial tensions (less than 0.001 dyne/cm).

Surfactant-induced displacement of NAPLs as free product has been shown to provide an efficient means of NAPL recovery in laboratory soil columns. For example, essentially all of the residual PCE was displaced from soil columns after injecting 1 pore volume of a surfactant solution which reduced the IFT to approximately 0.09 dyne/cm. In contrast, a surfactant solution which functioned as a solubilizing agent (i.e., the IFT was not low enough to induce mobilization) required approximately 20 pore volumes of flushing to reach achieve recovery efficiencies. Therefore, displacement of the NAPL phase as a free product is very attractive, both in terms of cost and time required for clean-up. However, utilization of this approach in the field could lead to the uncontrolled migration of the displaced free product. This is of particular concern for DNAPLs, which could travel downward through an aquifer formation until a confining layer was encountered. Thus, the displacement process could, in effect, create a NAPL distribution that was more difficult to remediate than the original spill.

In order to successfully employ the displacement process in the field, it is necessary to induce DNAPL displacement and control the subsequent migration of the free product.

It is therefore an object of the present invention to provide a method of groundwater remediation which is economically efficient.

It is a further object of the present invention to provide a method of NAPL displacement which does not lead to uncontrolled migration of the NAPLs.

SUMMARY OF THE INVENTION

To accomplish these and other objects, a process is provided which incorporates (a) density modification of the DNAPL using alcohol flushing and (b) interfacial reduction and NAPL displacement using surfactant flushing. In effect, the alcohol partitions into the DNAPL, converting it to a LNAPL (less dense than water), and then the surfactant solution acts to displace the newly created LNAPL. Because the NAPL is now less dense than water it tends to migrate upward due to buoyancy forces and can be easily extracted from wells. The alcohol can be introduced as a "preflush" prior to surfactant flushing or simultaneously as a component in the surfactant formulation. This approach allows for the efficient recovery of displaced DNAPLs in extraction wells, while solving the problem of downward DNAPL migration.

DESCRIPTION OF THE DRAWING FIGURES

DETAILED DESCRIPTION OF A PREFERRED EMBODIMENT

As used herein, the term "suitable" is used to refer to an alcohol or surfactant which is compatible with the compositions and methods providing herein and accomplishes the stated purpose. Suitability for the stated purpose may be determined by one of ordinary skill in the art by only routine experimentation using the procedures provided herein.

The preferred embodiment of the present invention is a method of aquifer remediation comprising the steps of:

a. modifying the density of the DNAPL by flushing the aquifer with a suitable alcohol; and
b. displacing the NAPL by flushing the aquifer with a suitable surfactant.

The density of the DNAPL is reduced by the flushing of the contaminated area with alcohol. The DNAPL becomes less dense as the alcohol partitions into it and becomes LNAPL. The NAPL is then displaced using surfactant flushing.

A surfactant solution must be selected that is capable of displacing NAPLs from porous media. The displacement process is based on the ability of surfactants to reduce the interfacial tension (IFT) between the NAPL and the aqueous phase, thereby allowing the NAPL to flow through the pore space. However, the reduction in IFT must be sufficient to allow for displacement of the NAPL. In general, this means that the surfactant solution must reduce the IFT below ~1 dyne/cm.

It should be noted that the displacement process will also be influenced by the density of the NAPL, velocity of the displacing fluid, effective permeability of the porous media, and the viscosity of the displacing fluid. In order for NAPL displacement to occur during surfactant flushing, the reduction in interfacial tension must be sufficient for viscous and buoyancy forces to overcome the capillary forces acting to retain NAPL globules within the porous medium. By considering the balance of forces acting on an entrapped NAPL globule, mathematical expressions can be derived to describe the relationship between viscous, buoyancy and capillary forces. The resulting Capillary number ($N_{Ca}$) and the Bond number ($N_B$) are dimensionless terms which represent the contribution of viscous and buoyancy forces, respectively, to NAPL displacement:

$$N_{Ca} = \frac{q_w \mu_w}{\sigma_{ow} \cos\theta} \quad N_B = \frac{\Delta\rho g k k_{rw}}{\sigma_{ow} \cos\theta}$$

where $q_w$ is Darcy velocity of the aqueous phase (L/t), $\mu_w$ is dynamic viscosity of the aqueous phase (M/Lt), $\sigma_{ow}$ is the interfacial tension between the NAPL and water phases (M/t$^2$), $\theta$ is the contact angle, $\Delta\rho$ is the difference in densities between the NAPL and aqueous phases (M/L$^3$), g is the gravity acceleration constant (L$^2$/t), k is intrinsic permeability of the porous medium (L$^2$), and $k_{rw}$ is the relative permeability of the aqueous phase (L$^2$/L$^2$).

Figure 1:
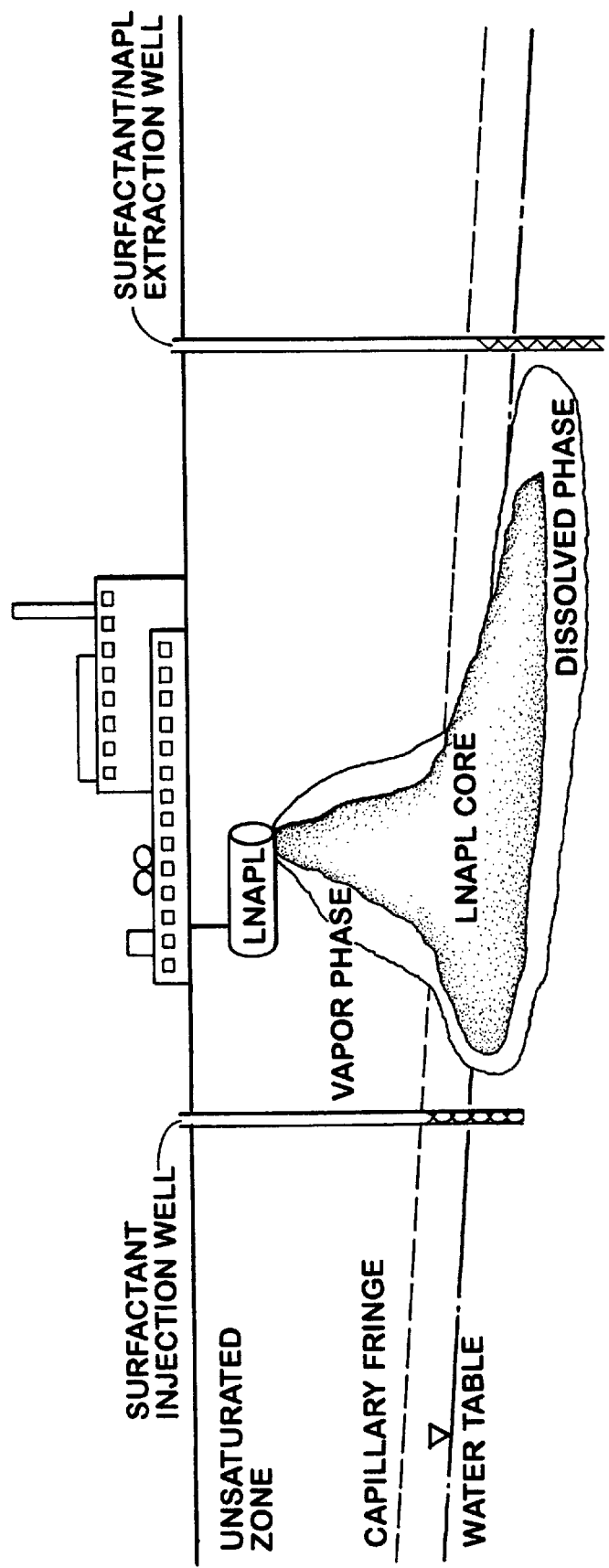
FIG. 1 is a schematic diagram of surfactant-enhanced remediation of an LNAPL spill.
Figure 2:
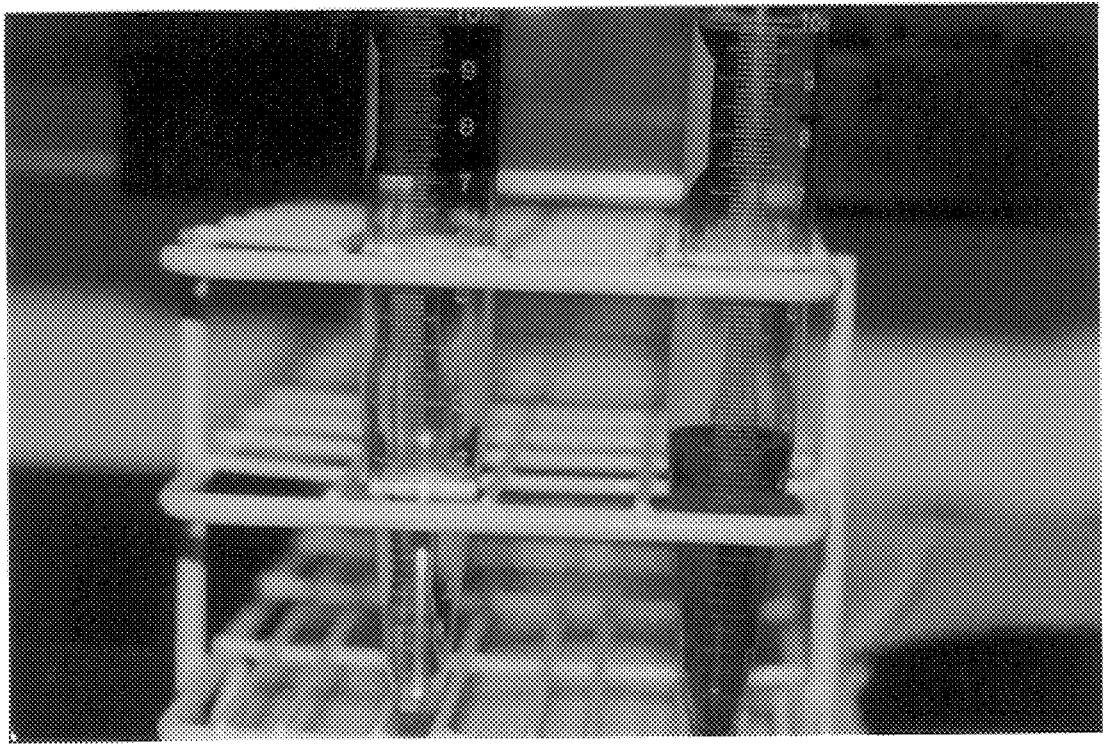
FIG. 2 is density modification of tetrachloroethylene (PCE, density=1.63 g/ml) in a batch reactor.

In most previous treatments of NAPL displacement gravitation or buoyancy forces were neglected (i.e., $N_B$=0). However, the importance of including buoyancy forces when assessing the potential for NAPL displacement has been demonstrated, particularly when dealing with DNAPLs such as PCE which could migrate downward through the subsurface. The results of PCE displacement experiments, as described in Example 4, using four size fractions of Ottawa sand are shown in FIG. 2. The saturation of PCE in the soil column is plotted versus the total trapping number, defined as $N_T=N_{Ca}+N_B$. As the interfacial tension of the displacing fluid was reduced from 47.8 dyne/cm (water) to 5.0 dyne/cm (4% WITCONOL 2722) there was little change in the residual saturation of PCE. However, when the interfacial tension decreased to 0.58 dyne/cm (4% AEROSOL MA/OT) and 0.09 dyne/cm (4% AEROSOL AY/OT) almost complete displacement of PCE from the soil columns was observed. Based on these data, the critical value of $N_T$ required the onset of NAPL mobilization falls within the range of 2×10$^{-5}$ and 5×10$^{-5}$.

The total trapping number ($N_T$), as defined above, can assist one skilled in the art to determine whether the NAPL will be displaced from the porous media by the surfactant solution. Example 1 further describes the method used to determine whether a particular surfactant is suitable for use in this invention by measuring the interfacial tension between the NAPL and the surfactant solution. Using this method, one skilled in the art can ascertain suitable surfactants for use in this invention using only routine experimentation.

As shown in Table 1, the 4% sodium dihexyl sulfosuccinate and sodium dioctyl sulfosuccinate (AEROSOL MA/OT) and 4% sodium diamyl sulfosuccinate and sodium dioctyl sulfosuccinate (AEROSOL AY/OT) solutions yielded sufficiently low IFTs (<0.5 dyne/cm) to displace the PCE from aquifer sands. This has been confirmed in column experiments. However, WITCONOL 2722 did not reduce the IFT sufficiently to displace significant quantities of PCE, and thus, is not deemed suitable for use in this invention. Based on the lower viscosity of sodium dihexyl sulfosuccinate and sodium dioctyl sulfosuccinate (AEROSOL MA/OT) compared to the 4% sodium diamyl sulfosuccinate and sodium dioctyl sulfosuccinate (AEROSOL AY/OT), the sodium dihexyl sulfosuccinate and sodium dioctyl sulfosuccinate (AEROSOL MA/OT) solution is preferred.

The modification of the density of the DNAPL by the alcohol is based upon the tendency for alcohols to partition into the NAPL phase. This results in swelling of the DNAPL phase and transformation of a DNAPL into an LNAPL, which is lighter than water. Therefore, the resulting NAPL after density modification rises to the top of the test vial and floats on the aqueous surfactant solution. In general, longer-chained alcohols ($C_4$–$C_{10}$) branched or unbranched are more likely to partition into NAPL phases. Example 2 describes the batch tests used to identify alcohols (added to surfactant solutions) that are able to convert a DNAPL to an LNAPL, and are, thus, suitable for use in this invention. Using this method, one of ordinary skill in the art can determine suitable alcohols for use in this invention using only routine experimentation.

Butanol is the preferred alcohol. The alcohol can either be added prior to the surfactant flushing or mixed with the surfactant. For example, an alcohol preflush solution (approximately 8% alcohol in water) may be used to enhance the mass transfer of alcohol into the NAPL phase prior to introduction of mixed alcohol/surfactant solution.

EXAMPLE 1

Three surfactant formulations were tested: polyoxyethylene (POE) (20) sorbitan monooleate (WITCONOL 2722, Witco Corp. or TWEEN, ICI Surfactants); a 4:1 mixture of sodium dihexyl sulfosuccinate and sodium dioctyl sulfosuccinate (AEROSOL MA/OT, American Cyanamid); and a 1:1 mixture of sodium diamyl sulfosuccinate and sodium dioctyl sulfosuccinate (AEROSOL AY/OT, American Cyanamid). All of the surfactants were used as received from the manufacturer, except for sodium dihexyl sulfosuccinate (AEROSOL MA-80) which was distilled to remove water and ethanol prior to use. Aqueous surfactant solutions (4% wt.) were prepared with deionized, distilled water that had passed through a Barnstead purification system. A background electrolyte, 500 mg/L of $CaCl_2$, was added to the sodium sulfosuccinate mixtures.

Interfacial tension measurements were performed using a spinning drop tensiometer. A small drop of the DNAPL (in this case PCE) was placed into a glass barrel containing the surfactant solution. The drop was then rotated at approximately 6,000 rpm and the size of the droplet is measured with an ocular microscope located on the tensiometer. Based on these measurements the IFT between the DNAPL and surfactant solution was calculated. Relevant data for the surfactant solutions tested are shown in Table 1.

TABLE 1

| Properties of displacing fluids used in EXAMPLE 1. | | | | |
|---|---|---|---|---|
| | IFT | PCE Solubility | | $\mu$ |
| Displacing Fluid | (dyne/cm) | (mg/L) | (g/cm$^3$) | (cpi) |
| MilliQ Water | 47.8 | 200 | 0.988 | 0.955 |
| 4% Witconol 2722 | 5.0 (0.05) | 34,100 | 1.005 (0.005) | 1.25 (0.05) |
| 4% 4:1 Aerosol MA/OT | 0.58 (0.004) | 16,300 | 1.009 (0.006) | 1.30 (0.06) |
| 4% 1:1 Aerosol AY/OT | 0.09 (0.003) | 71,720 | 1.027 (0.005) | 1.41 (0.04) |

EXAMPLE 2

Three alcohols were tested: ethanol, butanol and propanol. First, 2 mls of a DNAPL (either MCB, DCB, TCE or PCE) were added to a 10 ml graduated tested tube. Then, 8 mls of surfactant solution (4% 4:1 sodium dihexyl sulfosuccinate and sodium dioctyl sulfosuccinate (AEROSOL MA/OT)) containing different amounts of each alcohol were added to each tube. Thus, the total volume in each tube was 10 mls. The tubes were mixed on a vortex and allowed to settle. In the case of ethanol, an increase in the amount of alcohol from 0 to 24% did not result in a transition from a DNAPL to an LNAPL. When propanol was used, highly viscous solutions often formed, which were deemed unsuitable for flushing applications. However, when butanol was added to the surfactant solution, the DNAPL swelled and turned into an LNAPL. The density and viscosity of the NAPL phase was also measured using standard laboratory methods.

EXAMPLE 3

A matrix of batch experiments was conducted using different combinations of alcohols and a representative DNAPL, tetrachloroethylene (PCE, density=1.63 g/ml). In these experiments alcohols were added to a surfactant solution (typically 4% Aerosol MA/OT) and mixed with various amounts of PCE. Upon mixing the alcohol partitions into the PCE liquid phase, resulting in the expansion of the PCE and, more importantly, a reduction in the density of the NAPL. The results of a representative batch experiment are shown in FIG. 2. On the left-hand side of FIG. 2, a test tube is shown which contains density-modified PCE, which floats on top of the aqueous phase which initially contained 4% surfactant and 25% alcohol dissolved in water. On the right-hand side of FIG. 2, a test tube is shown which contains PCE which was not modified, that is, no alcohol was added to the surfactant solution. As can be seen in FIG. 2, PCE has been transformed from a DNAPL to an LNAPL in the test tube on the left.

The red liquid in FIG. 2 is PCE (colored red with an organic solubility dye) and the clear solution consists of water and surfactant, with or without alcohol. The tube on the left shows PCE following density modification. Note that the modified PCE "floats" on top of the surfactant solution. The surfactant solution introduced into this tube contained 4% Aerosol MA/OT and 25% butanol prior to contact with the PCE. The tube on the right shows PCE without density modification. Note that the PCE sinks to the bottom of the tube without the addition of butanol.

EXAMPLE 4

Figure 3:
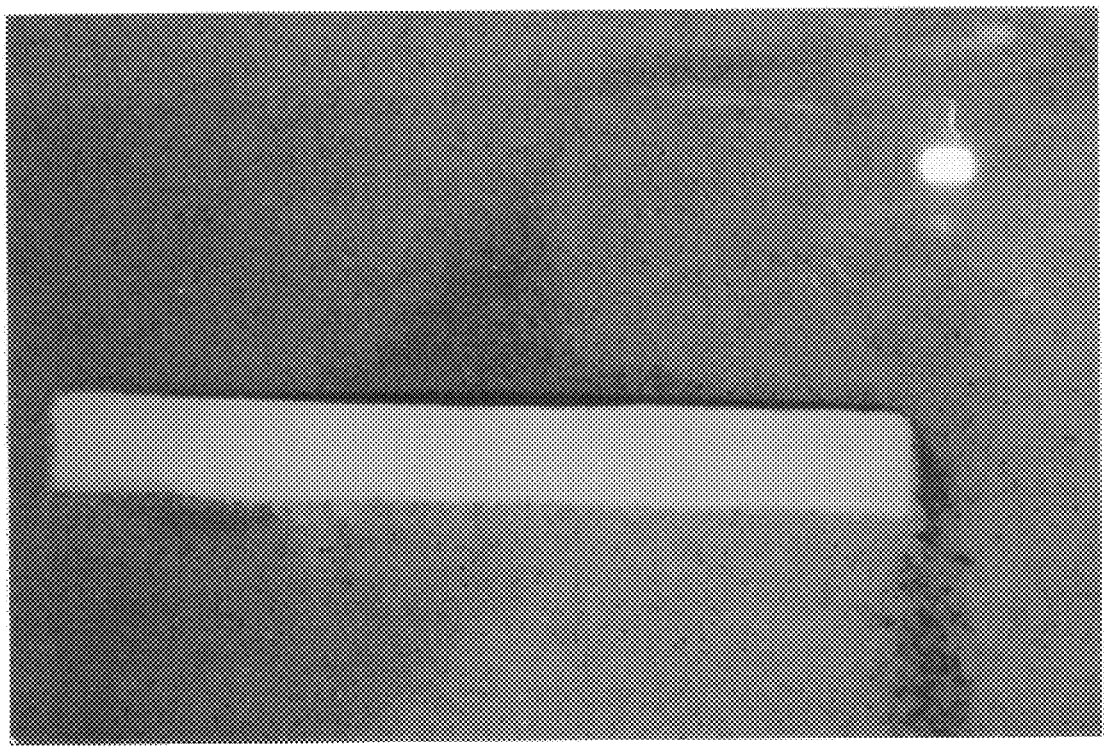
FIG. 3 is a density modification displacement (DMD) of PCE from a 2-dimensional aquifer cell.

Experiments were performed in a 2-dimensional aquifer cell (0.46 m height×0.61 m length×0.03 m inside width or thickness) packed with 20–30 mesh Ottawa sand. Initially, the sand was completely saturated with water, and then PCE (dyed red) was injected from the top of the cell. After release into the cell, the PCE liquid migrated downward until it reached a fine textured sand layer (40–270 mesh Ottawa sand), and in some cases flow around the fine layer until the bottom of the cell was reached (right-hand side of FIG. 3). After the PCE was emplaced, an aqueous solution containing 4% AEROSOL MA/OT (4:1 sodium dihexyl sulfasuccinate and sodium dioctyl sulfosuccinate) and 24% butanol (solution was dyed blue) was flushed through the aquifer cell from left to right (FIG. 3). The alcohol acted to change the PCE from a DNAPL to an LNAPL, while the surfactant acted to reduce the interfacial tension between the density-modified PCE and the aqueous phase to approximately 0.5 dyne/cm. As can be seen in FIG. 3, the displaced PCE was displaced to the right and upward as the alcohol/surfactant flush proceeded. The displaced PCE was then recovered in the extraction well on the right-hand side of the cell.

In this experiment the PCE was colored red with an organic-soluble dye and the surfactant solution (containing butanol) was colored blue with a water-soluble dye. A layer of fine sand (white color) was placed near the middle of the cell. The PCE was injected into the center of the aquifer cell, and then the surfactant+alcohol solution was pumped through the cell in a left-to-right direction. Notice that the displaced PCE moves to the right and upward as is evidenced by the areas of red near the top of the cell and the lower boundary of the fine sand layer.

Thus, the unique contribution of the Density Modification Displacement (DMD) invention is the coupling of DNAPL density modification using alcohol with either simultaneous or sequential NAPL displacement using the surfactant's ability to reduce the interfacial tension between the NAPL and aqueous phases.

While the invention has been explained in relation to its preferred embodiments, it is to be understood that various modifications thereof will become apparent to those skilled in the art upon reading this specification. The aforementioned examples and embodiments are therefore, to be considered in all respects as illustrative rather than restrictive, and the invention is not to be limited to the details given therein. Therefore, it is to be understood that the invention disclosed herein is intended to cover such modifications as fall within the scope of the appended claims.

What is claimed is:

1. A method for remediation of an aquifer contaminated by a non-aqueous phase liquid (NAPL) including a dense non-aqueous phase liquid (DNAPL) comprising the steps of:
   a. modifying the density of the DNAPL by flushing the aquifer with an alcohol the flushing of the aquifer with the alcohol serving to partition the alcohol into the NAPL phase resulting in a NAPL phase which is less than water; and
   b. displacing the NAPL by flushing the aquifer with a surfactant.

2. A method as defined in claim 1, wherein the step of displacing the NAPL by flushing the aquifer with a surfactant reduces the interfacial tension of the aquifer to less than 0.5 dyne/cm.

3. A method as defined in claim 1, wherein the steps of modifying the density of the DNAPL and displacing the NAPL are carried out simultaneously by flushing the aquifer with an alcohol and surfactant mixture.

4. A method as defined in claim 1, wherein the step of displacing the NAPL is carried out after the step of modifying the density of the NAPL.

5. A method as defined in claim 4, wherein the step of displacing the NAPL comprises flushing the aquifer with a suitable mixture of alcohol and surfactant.

6. A method as defined in claim 1, wherein:
   the flushing reduces the total trapping number ($N_T$) of the aquifer to between $2\times10^{-5}$ and $5\times10^{-5}$;
   wherein $N_T$ equals the sum of the Capillary Number ($N_{Ca}$) and the Bond Number ($N_B$);

$$N_{Ca} = \frac{q_w \mu_w}{\sigma_{ow} \cos\theta} \qquad N_B = \frac{\Delta\rho g k k_{rw}}{\sigma_{ow} \cos\theta}$$

where $q_w$ is Darcy velocity of the aqueous phase (L/t), $\mu_w$ is dynamic viscosity of the aqueous phase (M/Lt), $\sigma_{ow}$ is the interfacial tension between the NAPL and water phases (M/t$^2$), $\theta$ is the contact angle, $\Delta\rho$ is the difference in densities between the NAPL and aqueous phases (M/L$^3$), g is the gravity acceleration constant (L$^2$/t), k is intrinsic permeability of the porous medium (L$^2$), and $k_{rw}$ is the relative permeability of the aqueous phase (L$^2$/L$^2$).

7. A composition for density modification displacement of a DNAPL contaminated aquifer including porous media comprising:
   a. an alcohol capable of partitioning at least a portion of the DNAPL into LNAPL; and
   b. a surfactant capable of displacing the LNAPL from the porous media the surfactant being selected from the group consisting of surfactant which reduce the inner facial tension between the NAPL and the aqueous phase to below about 1.0 dyne/cm.

8. A method for remediation of a contamination zone of an aquifer formation, the contamination zone including a porous medium contaminated by a non-aqueous phase liquid (NAPL) at least a portion of which is a dense non-aqueous phase liquid (DNAPL), the method for remediation comprising the steps of:
   a. reducing the density of the DNAPL in the contamination zone by flushing the zone with an alcohol solution resulting in a NAPL phase that is less dense than water (LNAPL); and
   b. displacing the LNAPL by flushing the contamination zone with a surfactant formulation, the surfactant formulation modifying the interfacial tension between the LNAPL and the surfactant formulation such that the LNAPL is capable of displacement through the porous medium.

9. The method for remediation according to claim 8, wherein steps (a) and (b) simultaneously are carried out by flushing the contamination zone with an alcohol solution and surfactant formulation mixture.

10. The method for remediation according to claim 8, wherein step (b) is carried out after step (a).

11. The method for remediation according to claim 10, wherein the surfactant formulation of step (b) comprises alcohol.

12. The method for remediation according to claim 8, wherein:
   the flushing results in the total trapping number ($N_T$) of the aquifer being greater than $2\times10^{-5}$;
   wherein $N_T$ equals the sum of the Capillary Number ($N_{Ca}$) and the Bond Number ($N_B$);

$$N_{Ca} = \frac{q_w \mu_w}{\sigma_{ow}\cos\theta} \qquad N_B = \frac{\Delta\rho g k k_{rw}}{\sigma_{ow}\cos\theta}$$

where $q_w$ is Darcy velocity of the aqueous phase (L/t), $\mu_w$ is dynamic viscosity of the aqueous phase (M/Lt), $\sigma_{ow}$ is the interfacial tension between the NAPL and water phases (M/t²), θ is the contact angle, Δρ is the difference in densities between the NAPL and aqueous phases (M/L³), g is the gravity acceleration constant (L²/t), k is intrinsic permeability of the porous medium (L²), and $k_{rw}$ is the relative permeability of the aqueous phase (L²/L²).

13. The method for remediation according to claim 12, wherein the flushing results in the total trapping number ($N_T$) of the aquifer being greater than $1\times10^{-4}$.

* * * * *